(12) United States Patent
Alexander et al.

(10) Patent No.: US 10,086,843 B2
(45) Date of Patent: Oct. 2, 2018

(54) METHOD FOR ASSISTING A USER OF A MOTOR VEHICLE, MULTIMEDIA SYSTEM, AND MOTOR VEHICLE

(75) Inventors: Jean-Philippe Alexander, La Riche (FR); Thomas Chapuis, Antony (FR)

(73) Assignee: RENAULT s.a.s., Boulogne-Billancourt (FR)

(*) Notice: Subject to any disclaimer, the term of this patent is extended or adjusted under 35 U.S.C. 154(b) by 0 days.

(21) Appl. No.: 14/238,354

(22) PCT Filed: Jul. 3, 2012

(86) PCT No.: PCT/FR2012/051545
§ 371 (c)(1),
(2), (4) Date: Apr. 17, 2014

(87) PCT Pub. No.: WO2013/021109
PCT Pub. Date: Feb. 14, 2013

(65) Prior Publication Data
US 2014/0236423 A1    Aug. 21, 2014

(30) Foreign Application Priority Data

Aug. 11, 2011   (FR) ...................................... 11 57292

(51) Int. Cl.
*G01C 21/34*   (2006.01)
*G06Q 30/00*   (2012.01)
(Continued)

(52) U.S. Cl.
CPC ......... *B60W 50/08* (2013.01); *G01C 21/3617* (2013.01); *G06Q 30/02* (2013.01); *G08G 1/0962* (2013.01)

(58) Field of Classification Search
CPC ... B60W 50/08; G06Q 30/02; G01C 21/3617; G08G 1/0962
See application file for complete search history.

(56) References Cited

U.S. PATENT DOCUMENTS 6,401,029 B1    6/2002   Kubota et al.
6,853,896 B2 *  2/2005   Akiyama ........................ 701/36
(Continued)

FOREIGN PATENT DOCUMENTS

GB    2 366 055         2/2002
JP    1988-260050       9/1998
(Continued)

OTHER PUBLICATIONS

French Search Report dated Nov. 28, 2011 in Application No. FR 1157292 Filed Aug. 11, 2011.
(Continued)

*Primary Examiner* — Alan D Hutchinson
(74) *Attorney, Agent, or Firm* — Oblon, McClelland, Maier & Neustadt, L.L.P.

(57) ABSTRACT

A method for assisting a user of a motor vehicle, including: acquiring parameters associated with a context in which the motor vehicle is being used; developing a list of suggested actions; selecting a suggested action from among the list of suggested actions in accordance with the context in which the motor vehicle is being used; and transmitting the selected suggested actions to the user via a man/machine interface. A multimedia system, a motor vehicle, and a computer medium can implement the method.

20 Claims, 1 Drawing Sheet

(51) Int. Cl.
  *G08G 1/0962* (2006.01)
  *B60W 50/08* (2012.01)
  *G01C 21/36* (2006.01)
  *G06Q 30/02* (2012.01)

(56) References Cited

U.S. PATENT DOCUMENTS

| | | |
|---|---|---|
| 2006/0229802 A1 | 10/2006 | Vertelney et al. |
| 2008/0082226 A1 | 4/2008 | Amador et al. |
| 2010/0026526 A1 | 2/2010 | Yokota |
| 2010/0128863 A1* | 5/2010 | Krum et al. ............ 379/207.02 |

FOREIGN PATENT DOCUMENTS

| | | |
|---|---|---|
| JP | 2003-252130 | 3/2002 |
| JP | 2005-329800 | 12/2005 |
| JP | 2006-133006 | 5/2006 |
| JP | 2006-177735 | 7/2006 |
| JP | 2006-184008 | 7/2006 |
| JP | 2007-022133 | 2/2007 |
| JP | 2008-094218 | 4/2008 |
| JP | 2010-071656 | 4/2010 |

OTHER PUBLICATIONS

International Search Report dated Sep. 6, 2012 in PCT/FR12/051545 Filed Jul. 3, 2012.
Office Action in JP Application No. 2014-524427 dated May 10, 2016 (with English short summary of reasons for rejection).
Office Action in JP Application No. 2014-524427 dated Feb. 7, 2017 (with English short summary of reasons for rejection).

* cited by examiner

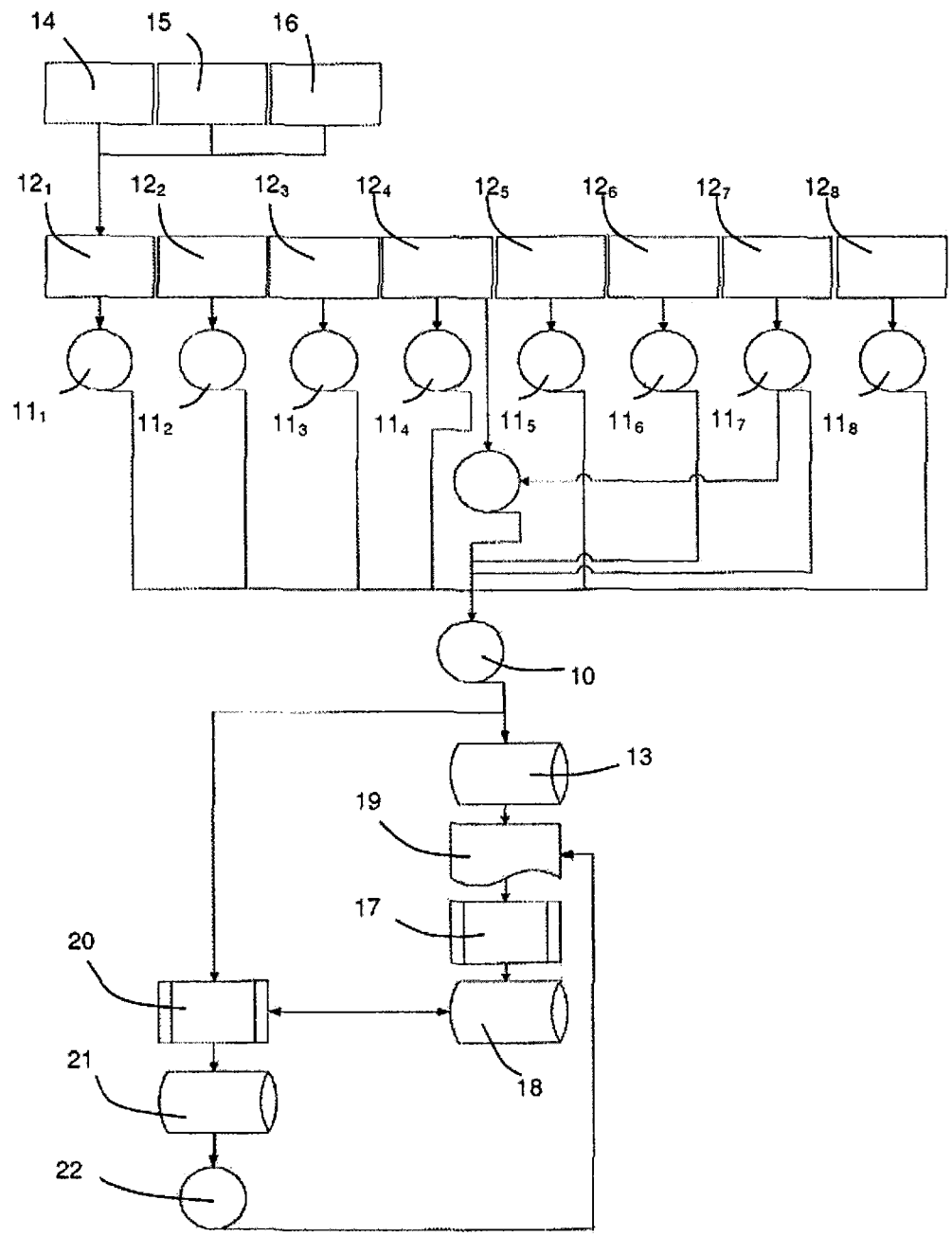

METHOD FOR ASSISTING A USER OF A MOTOR VEHICLE, MULTIMEDIA SYSTEM, AND MOTOR VEHICLE

TECHNICAL FIELD OF THE INVENTION

The invention relates to the field of assisting a user of a motor vehicle.

More specifically, the invention relates to a method of assistance of this type in which parameters associated with the context in which the motor vehicle is being used and operated are acquired. It also relates to a multimedia system installed on board a motor vehicle, as well as to a motor vehicle and a data medium.

PRIOR ART

Present-day multimedia systems installed on board motor vehicles can be used to access and manage a very large amount of data, equal to the amount available on a computer, for example. Connection of these systems to the internet makes data access virtually unlimited.

Conventionally, in order for an on-board multimedia system to supply information to a user, the latter must carry out numerous activities, for example by a process of navigation in which the information is searched for in a more or less complex tree structure or database. However, this access to a virtually unlimited amount of information gives rise to the problem of making the multimedia system user-friendly, in order to facilitate information searching and to increase safety in a context in which the vehicle is being driven by the user.

It has already been proposed that provision be made to acquire parameters associated with the context in which the vehicle is being used, in order to use them subsequently to manage a multimedia system on board a motor vehicle.

The document EP-B1-1699032 describes a control and assistance solution of this type, in which the parameters acquired in relation to the context in which the vehicle is being used are exploited in order to place the information to be supplied to the user in a hierarchical order, and to create an order in the subsequent transmission of the various items of information.

On the other hand, the document US2011/0035144 describes a solution in which the parameters acquired in relation to the context in which the vehicle is being used serve to generate the characteristics related to the driver, for the ultimate purpose of controlling, according to these driver characteristics, the updating of the states of display of operating buttons displayed on a display unit.

These existing solutions are therefore restricted to the limiting or ordering of the information to be supplied to the vehicle user in highly specific situations, and do not offer a general solution to the problem of providing user-friendliness and safety for a user of a motor vehicle who wishes to use multimedia functionality and information on a large scale.

OBJECT OF THE INVENTION

The main object of the invention is to propose a solution for assisting a user of a motor vehicle which provides a combined response to the problems of safety, user-friendliness and safety.

Another object is to propose a solution which improves the discovery of user-accessible information by means of a multimedia system, and which helps to entertain the user.

A first aspect of the invention relates to a method of assisting a user of a motor vehicle, comprising a step of acquiring parameters associated with the context in which the motor vehicle is being used.

The method comprises the following steps:
compiling a list of suggested actions,
selecting suggested actions from among this list of suggested actions in accordance with the context in which the motor vehicle is being used,
transmitting these selected suggested actions to the user via a human-machine interface.

The acquisition step may comprise storing parameters associated with the context in which the motor vehicle is being used in an electronic storage device. A storing operation may be carried out for each identified user.

The parameters associated with the context in which the motor vehicle is being used may be chosen from among any or all of:
the identification of the user,
the monitoring record of the itineraries followed by the user, the positions of the vehicle and the periods for which the vehicle is parked,
the monitoring record of the user's actions on an on-board multimedia system,
the time slot,
working days or weekend,
the number of occupants of the vehicle,
the monitoring record of the driving,
the monitoring record of the information on the vehicle dashboard,
the monitoring record of the events in the on-board multimedia system.

The step of compiling a list of suggested actions may comprise the following sub-steps:
generating at least one suggested action on the basis of the stored parameters,
recording the generated suggestion in an electronic storage device containing the list of suggested actions.

Generating a suggestion may comprise defining a triggering event and a corresponding action associated with this suggested action. Generating a suggestion may comprise defining a name and/or a reaction of the human-machine interface and/or graphic elements associated with this suggested action.

Selection of a given suggested action from among the list of suggested actions is activated, for example, if the context in which the vehicle is being used corresponds to the triggering event associated with this suggested action.

The list of suggested actions may comprise suggested actions of the "communication" and/or "navigation" and/or "multimedia" and/or "system" category.

The suggested actions of the "communication" category may comprise any or all of the following suggestions:
play an SMS message when a new SMS is received,
call back a caller who has made a missed call,
display a task when a reminder of this task appears,
open a record associated with a friend of the user if this friend is in the geographical proximity of the vehicle.

The suggested actions of the "navigation" category may comprise any or all of the following suggestions:
activate a "tourist" mode if the vehicle is traveling through an unfamiliar area,
provide guidance toward a special location if this location is nearby,
display rest and/or refreshment areas if the period of travel exceeds a predetermined value,
display variant itineraries in case of congestion.

The suggested actions of the "multimedia" category may comprise any or all of the following suggestions:

play a suggested musical selection if there is a similarity with the user's habits and/or if a suggestion to play is made by an occupant other than the user and/or if there is a recommendation by a social network linked to the user and/or if there is a connection to a nomadic element if at least two occupants are present, play a musical game if at least three occupants are present, play unplayed episodes of a podcast to which the user subscribes, play a radio broadcasting station which is suggested according to the user's listening habits and/or according to the location of the vehicle.

The suggested actions of the "system" category may comprise any or all of the following suggestions:

discover a "widget" if it corresponds to the recorded interests of the user and/or in case of similarity to widgets already downloaded, record personal telephone numbers and/or email addresses if a telephone and/or an internet connection is detected, offer assistance or explanations regarding functions or gestures having a low or zero level of use or execution.

The method may comprise a step of observing the use made by the user of each of the suggested actions on the list, and a step of withdrawing suggested actions from the list or retaining them thereon according to the result of the observation. The observation is carried out, notably, by means of a counter of the number of launches of suggested actions from the list.

A second aspect of the invention relates to a multimedia system installed on board a motor vehicle to assist the user of the motor vehicle, comprising a control unit which executes a method as described above, the multimedia system comprising a human-machine interface for transmitting to the user the suggested actions received from the control unit.

The control unit may comprise:

a module for compiling suggested actions, which generates probable suggested actions and records them in a list of suggested actions contained in an electronic storage device, and a selection module adapted to select at least one suggested action from among the list of suggested actions, if the context in which the vehicle is being used corresponds to the triggering event associated with this suggested action, and to transmit it to the human-machine interface.

A third aspect of the invention relates to a motor vehicle fitted with a multimedia system as described above.

The vehicle may comprise devices adapted to generate parameters associated with the context in which the motor vehicle is being used.

A fourth aspect of the invention relates to a data medium which is readable by a control unit and on which is recorded a computer program comprising computer program code means for executing the steps or sub-steps of a method of assistance as described above.

BRIEF DESCRIPTION OF THE DRAWINGS

Other advantages and characteristics will be more clearly understood from the following description of specific embodiments of the invention, provided by way of non-limiting example and represented in the single FIGURE which is a logical diagram of the software and hardware architecture of a control unit fitted to a multimedia system executing a method of assistance according to the invention.

DESCRIPTION OF PREFERRED EMBODIMENTS OF THE INVENTION

In the following text, the term "user" denotes any person able to interact with the human-machine interface. Notably, it denotes either a user who is a driver or a user who is a passenger.

The principle of the invention is based on the idea of assisting a user of a motor vehicle, regardless of whether he is a driver or a passenger, by carrying out a transmission of suggested actions to the user via a human-machine interface. These suggested actions are compiled and then transmitted to the interface by a control unit on the basis of parameters associated with the context in which the vehicle is being used and operated. The interface may also be used advantageously for supplying other information to the user.

As detailed below, the control unit carries out a continuous or periodic acquisition of the parameters associated with the context in which the motor vehicle is being used, these parameters being related to the user or to the vehicle, for example to the dynamics of the vehicle and/or to the external environment of the vehicle and/or to driving actions performed by the driver of the vehicle and/or to actions which are not necessarily related to the driving action but which are performed by the driver while driving, on one or more of the devices which are permanently or temporarily present on board the vehicle. Thus the parameters may originate from any number of devices which are installed on board the vehicle and which are intended for all these operations.

While transmitting suggested actions for the attention of the user, where each of these suggestions invites the user to perform an action, the control unit can be used to generate temporary shortcuts to the content of databases or to functions, according to the context in which the vehicle is being used in real time. Thus the user, by performing a single action of validating the suggestion transmitted to him by the interface, can launch the action which the suggestion invites him to perform, thereby avoiding the need to perform multiple path following or searching actions in the control tree structure of the system to achieve the same result.

In this way it is possible, on the one hand, to increase the safety of use in driving by reducing the number of actions which the driver user has to perform, and, on the other hand, to offer additional functionality, to enable content to be discovered, and thus contribute to the entertainment of the passenger user.

By way of example, the suggested actions can be transmitted to the user in the form of a display on a dedicated screen which can also be designed for the supply of other information to the user. The display of the suggested actions may take the form of a bar of suggestions which in practice constitutes a bar of context-dependent shortcuts at a location on the display screen.

The multimedia system incorporating the control unit may, on the other hand, be controlled in any possible way, by a control button provided in the passenger compartment of the vehicle, or by an element which can be detached from the vehicle, such as a mobile telephone or a portable computer.

An example of a logical structure of the software and hardware architecture of the control unit is shown in detail in the appended FIGURE.

The control unit comprises an acquisition module 10 which collects parameters observed by various monitoring modules 11, associated with devices 12 which are related to and/or influence the context in which the vehicle is being used and operated, and are installed on board the vehicle.

For example, these devices may be:
- a network of the vehicle $12_1$,
- a human-machine interface $12_2$,
- removable devices $12_3$,
- a GPS module $12_4$,
- a clock of the vehicle $12_5$,
- seat belt sensors $12_6$,
- an internet connection $12_7$,
- a telephone $12_8$.

The network device of the vehicle $12_1$ may itself be associated with the dashboard 14, and/or with the pedal control and monitoring system 15, and/or with the driving monitoring system 16, in order to supply parameters obtained therefrom to the module 10.

Thus a step of acquisition by the module 10 may comprise the acquisition, properly so called, of parameters associated with the context in which the vehicle is being used, by the module 10, the parameters being generated by devices 12, via corresponding modules 11, followed by the storage of the parameters thus acquired, in the form of a data stack in an electronic storage device 13.

The parameters associated with the context in which the motor vehicle is being used may be chosen, for example, from among the following:
- the identification of the user,
- the monitoring record of the itineraries followed by the user, the positions of the vehicle and the periods for which the vehicle is parked,
- the monitoring record of the user's actions on an on-board multimedia system,
- the time slot,
- working days or weekend,
- the number of occupants of the vehicle,
- the monitoring record of the driving,
- the monitoring record of the information on the vehicle dashboard,
- the monitoring record of the events in the on-board multimedia system.

A storing operation may if necessary be carried out for each user identified by the multimedia system. In other words, there may be as many data stacks in the storage device as there are users of the multimedia system.

The method of assistance then comprises a step of compiling a list of suggested actions. This step may comprise the following sub-steps:
- generating at least one suggested action on the basis of the stored parameters,
- recording the generated suggestion in the list of suggested actions.

For this purpose, the control unit may comprise a module 17 for compiling suggested actions, which generates probable suggested actions and records them in a list of suggested actions contained in an electronic storage device 18.

Notably, the generation of a suggestion by the module 17 may comprise storing or assigning a triggering event and a corresponding action, these two fields being associated with this suggested action. It may also comprise storing or assigning a name and/or a reaction of the human-machine interface and/or graphic elements associated with this suggested action.

For example, when an SMS is received, a suggestion may be generated for which the action would be the reading of the SMS by the system, while the associated graphic element could be the photograph of the contact who sent the SMS, this photograph being retrieved from the user's address book.

The generation is performed by the compilation module 17 on the basis of predetermined algorithms 19. These algorithms are meta-rules instantiated on the basis of context elements stored in the module 13 and on the basis of the observation of the recurrence in the user's behavior or in that of his vehicle (for example, a meta-rule for a suggested detour to a frequent stopping place is described by the closeness of the predicted path of the vehicle to one of the frequent stopping places recorded in the module 13).

The method of assistance then comprises a step of selecting suggested actions from among this list of suggested actions in accordance with the context in which the motor vehicle is being used; in other words, ultimately, in real time, in accordance with the parameters acquired by the module 10.

For this purpose, the control unit comprises a selection module 20 adapted to select at least one suggested action from among the list of suggested actions, if the context in which the vehicle is being used corresponds to the triggering event associated with this suggested action.

The method of assistance then comprises a step of transmitting the suggested actions, selected in this way by the module 20, to the user via a human-machine interface 21. In other words, the selection module 20 is adapted to transmit each suggested action selected from the list to the human-machine interface 21, in order to display it, for example.

The control unit may also comprise a monitoring or surveillance module 22 adapted to carry out a step of observing the use made by the user of each of the suggested actions offered to the user from the list, and executes a step of withdrawing suggested actions from the list or retaining them thereon according to the result of the observation. The observation carried out by the module 22 may be provided by means of a counter of the number of choices of suggested actions made by a user. Thus, the module 22 can perform an analysis, based on the number of launches of each suggestion, to determine whether it is appropriate to keep the suggestion in the list for subsequent offering.

Therefore it is clear from the above description that the multimedia system installed on board a motor vehicle to assist the user of the motor vehicle, comprising the control unit for this purpose, also comprises the human-machine interface 21 for transmitting to the user the suggested actions received from the control unit.

The control unit may comprise all the software and hardware means required to execute a method of assistance as described above. Notably, the invention relates to any data medium which is readable by the control unit and on which is recorded a computer program comprising computer program code means for executing the steps and sub-steps of a method of assistance as described above.

As will be apparent from the detailed explanations below, the list of suggested actions comprises suggested actions of the "communication" and/or "navigation" and/or "multimedia" and/or "system" category.

The suggested actions of the "communication" category may comprise any or all of the following suggestions:
- play an SMS message when a new SMS is received,
- call back a caller who has made a missed call,
- display a task when a reminder of this task appears,
- open a record associated with a friend of the user if this friend is in the geographical proximity of the vehicle.

The suggested actions of the "navigation" category may comprise any or all of the following suggestions:

activate a "tourist" mode if the vehicle is traveling through an unfamiliar area, provide guidance toward a special location if this location is nearby, display rest and/or refreshment areas if the period of travel exceeds a predetermined value, display variant itineraries in case of congestion.

The suggested actions of the "multimedia" category may comprise any or all of the following suggestions:

play a suggested musical selection if there is a similarity with the user's habits and/or if a suggestion to play is made by an occupant other than the user and/or if there is a recommendation by a social network linked to the user and/or if there is a connection to a nomadic element if at least two occupants are present, play a musical game if at least three occupants are present, play unplayed episodes of a podcast to which the user subscribes, play a radio broadcasting station which is suggested according to the user's listening habits and/or according to the location of the vehicle.

The suggested actions of the "system" category may comprise any or all of the following suggestions:

discover a "widget" if it corresponds to the recorded interests of the user and/or in case of similarity to widgets already downloaded, record personal telephone numbers and/or email addresses if a telephone and/or an internet connection is detected, offer assistance or explanations regarding functions or gestures having a low or zero level of use or execution.

Four tables are presented below, detailing, by category, the various suggested actions that may be envisaged as listed above, and showing for each suggested action the name of the suggestion, the associated triggering event, the associated corresponding action, and finally the reaction of the human-machine interface for the purpose of executing the action.

"Communication" Category

| Suggestion | Triggering event | Suggested action | Reaction of the HMI |
| --- | --- | --- | --- |
| SMS received | as soon as a new SMS is received | "play" the SMS | launches the playing of the SMS in TTS in full page mode temporarily, then goes to the secondary bar. |
| Last missed call | as soon as a call is missed and if the number was not masked | "call back" the caller | Redials the number in full page mode temporarily, then goes to the secondary bar |
| Task to be performed | when the task reminder appears. May be done via the internal task management function of the system or may be coupled to an external task/call back/alarm management source, regardless of whether this is an application run as a widget or by the connected nomad. | "display" the task | Displays the task in full page mode with the possibility of managing the task concerned: task executed, postpone the task, etc. |
| Connect to a nearby friend | as soon as a friend from the user's social network is visible by GPS observation means (e.g. Google Latitude) and is near the user's vehicle. | "open" the friend's record | Displays the descriptive record of the friend in full page mode (content variable according to the geolocation service of the underlying individuals) and the corresponding actions: call, be guided, see more information, etc. |

"Navigation" Category

| Suggestion | Triggering event | Suggested action | Reaction of the HMI |
| --- | --- | --- | --- |
| View the tourist information | if the vehicle is traveling through an area not habitually passed through | "activate" the "tourist" mode | Displays the tourist information in full page mode and triggers the associated audio feedbacks |
| Detour toward a favored POI | as soon as a POI marked as favorite by the user is near the vehicle | "guide" toward the POI | Triggers guidance (if there is no guidance in progress) or modifies the current itinerary (if guidance is in progress). Displays the new itinerary data in full page mode. |

-continued

| Suggestion | Triggering event | Suggested action | Reaction of the HMI |
|---|---|---|---|
| Detour toward a service station (for fuel or electrical charging) | 2 cases: in case of proximity to a low-cost service station at a low fuel level according to the fuel reserve, if only one service station can now be reached | "guide" toward the service station | Triggers guidance (if there is no guidance in progress) or modifies the current itinerary (if guidance is in progress). Displays the new itinerary data in full page mode. |
| Take rest break | after more than 2 hours of travel | "display" the nearest rest points (parking lots, rest areas, etc.). If the travel was started during the day, a hotel may be suggested after a certain time at night. | Displays the 5 nearest rest points in full page mode for guidance/detour. |
| Take lunch or dinner break | after more than 2 hours of travel if lunch or dinner time has gone past | "display" the nearest restaurants. | Displays the 5 nearest restaurants in full page mode for guidance/detour. |
| Traffic detour | If congestion occurs on the current guidance itinerary, or on the itinerary frequently observed by the system if no guidance is in progress. | "display" the suggested detour(s) | Displays the map in full page mode showing the location of the traffic incident, the position of the vehicle, the current itinerary or the itinerary considered to be in progress, and the suggested detour. Display of the gain in time, and the difference in terms of km. |

"Multimedia" Category

| Suggestion | Triggering event | Suggested action | Reaction of the HMI |
|---|---|---|---|
| Similar album or artist | as soon as a selection is played. Suggestion constantly refreshed in accordance with what is played by the user. It is therefore assumed that the user is playing something. | "play" the suggested selection | launches playing in full page mode temporarily, then goes to the secondary bar. |
| Selections, album, artist or playlist suggested by other users present in the vehicle | as soon as an occupant decides to submit a piece of music to be played via his HMI. Assumes that there is at least one person in addition to the driver in the vehicle, and that this person has a means of interacting with the system to suggest a piece of music; also that this music is already in the system or in a connected nomad. May be suggested even if the user is not playing anything. | "play" the suggested selection | launches playing in full page mode temporarily, then goes to the secondary bar. |
| Selections, album, artist or playlist recommended by the social network | as soon as the music is recommended via the social network services to which the user subscribes. May be suggested even if the user is not playing anything. | "play" the suggested selection | launches playing in full page mode temporarily, then goes to the secondary bar. |
| Discover music on the nomads connected in the vehicle (random reading or based on genres common to all) | starting from 2 occupants detected and one nomad connected. May be suggested even if the user is not playing anything. | "play" the suggested selection | launches playing in full page mode temporarily, then goes to the secondary bar. |

-continued

| Suggestion | Triggering event | Suggested action | Reaction of the HMI |
| --- | --- | --- | --- |
| Musical game/quiz | starting from 3 occupants detected. May be suggested even if the user is not playing anything. | "play" the quiz | starts the musical game in full page mode permanently. |
| Latest episodes of podcasts | as soon as a new episode of one of the podcasts to which the user subscribes is available. May be suggested even if the user is not playing anything. | "play" all the latest episodes that have not been played | launches playing in full page mode temporarily, then goes to the secondary bar. |
| Radio | when there is a correlation among: the name of the radio station frequently played, a certain time of day, certain days, a user alone or accompanied, and a certain path. May be suggested even if the user is not playing anything. For example, the user plays France Info every Monday morning when alone in his vehicle. As soon as the user drives onto the freeway, when setting off on vacation (usually in working hours), he plays Autoroute FM. | "play" the suggested radio station | launches playing in full page mode temporarily, then goes to the secondary bar. |
| Local radio, digital or other | When the vehicle is in a non-habitual area according to the monitoring of the itineraries followed, or when the user is new (assuming that the user has been identified). If the user is on the freeway, the system may suggest that he plays Autoroute FM or any other equivalent radio station. | "play" the suggested radio station | launches playing in full page mode temporarily, then goes to the secondary bar. |

"System" Category

| Suggestion | Triggering event | Suggested action | Reaction of the HMI |
| --- | --- | --- | --- |
| Widgets | in accordance with the recorded interests of the user (compare with the parameter setting of the suggestion bar) OR according to the similarity of widgets already downloaded | "discover the widget" | Displays the descriptive record of the widget in full page mode via the on-board widget store so that the user may or may not add this widget to the system menu. |
| Set the system parameters | according to the detection of a connected telephone, the internet connection, etc. | "register his messaging number", "register his mailbox", "synchronize the directory of his mobile telephone", etc. | Displays the page corresponding to the action suggested by the system, to enable the user to complete the parameter setting action. |
| Gestures (for a remote touch controller) | After the monitoring of the user's gestures, if some gestures are never made. | "tip" | Displays the help video in full page mode, showing the gesture or gestures that have not been used in context. |

-continued

| Suggestion | Triggering event | Suggested action | Reaction of the HMI |
|---|---|---|---|
| Tips | Executed automatically after a certain period of use, if some functions are not used. | "Did you know?" on: how to access shortcuts, add a widget, add a contact, add a photo to a contact, etc. | Displays the help video in full page mode, showing the action/tip/function to be discovered |

The invention claimed is:

1. A method of assisting a user of a motor vehicle, comprising:
    acquiring parameters associated with a context in which the motor vehicle is being used;
    determining that the motor vehicle is being used in said context based on said parameters;
    compiling a list of probable suggested actions including new suggested actions generated based on actions historically performed by the user in said context;
    selecting at least one new suggested action from among the list of probable suggested actions in real time when it is determined that the motor vehicle is being used in said context; and
    transmitting the selected new suggested action to the user via a human-machine interface while the motor vehicle is being used in said context, wherein said determining, compiling, selecting and transmitting are performed automatically to provide the user with a single action input command for executing the selected new suggested action while the motor vehicle is being used in said context.

2. The method as claimed in claim 1, wherein the acquiring comprises storing parameters associated with the context in which the motor vehicle is used in an electronic storage device.

3. The method as claimed in claim 2, wherein a storing operation is carried out for each identified user.

4. The method as claimed in claim 1, wherein the parameters associated with the context in which the motor vehicle is used are chosen from among any or all of:
    an identification of the user;
    a monitoring record of itineraries followed by the user, positions of the vehicle and periods for which the vehicle is parked;
    a monitoring record of user's actions on an on-board multimedia system;
    a time slot;
    working days or weekend;
    a number of occupants of the vehicle;
    a monitoring record of driving;
    a monitoring record of information on a dashboard of the vehicle; and
    a monitoring record of events in the on-board multimedia system.

5. The method as claimed in claim 2, wherein the compiling a list of probable suggested actions comprises:
    generating at least one new suggested action based on the stored parameters;
    recording the generated new suggested action in an electronic storage device including the list of probable suggested actions.

6. The method as claimed in claim 1 wherein:
    the acquiring comprises storing the parameters associated with the context in which the motor vehicle is being used in an electronic storage device;
    the compiling a list of probable suggested actions comprises:
        generating at least one new suggested action based on the stored parameters, and
        recording the generated new suggested action in an electronic storage device including the list of suggested actions; and
        the generating at least one new suggested action comprises defining a triggering event and a corresponding action associated with the new suggested action.

7. The method as claimed in claim 6, wherein the generating at least one new suggested action comprises defining a name and an associated reaction of the human-machine interface, or generating graphic elements associated with the suggested action.

8. The method as claimed in claim 6, wherein the selecting at least one new suggested action from among the list of probable suggested actions is activated if the context in which the vehicle is being used corresponds to a triggering event associated with the at least one new suggested action.

9. The method as claimed in claim 1, wherein the list of probable suggested actions comprises at least one of probable suggested actions of communication, navigation, multimedia and system category.

10. The method as claimed in claim 9, wherein the probable suggested actions of the communication category comprise any or all of:
    play an SMS message when a Previously Presented SMS is received;
    call back a caller who has made a missed call;
    display a task when a reminder of the task appears; and
    open a record associated with a friend of the user if the friend is in geographical proximity of the vehicle.

11. The method as claimed in claim 9, wherein the probable suggested actions of the navigation category comprise any or all of:
    activate a tourist mode if the vehicle is traveling through an unfamiliar area;
    provide guidance toward a special location if a location is nearby;
    display rest and/or refreshment areas if a period of travel exceeds a predetermined value; and
    display variant itineraries in case of congestion.

12. The method as claimed in claim 9, wherein the probable suggested actions of the multimedia category comprise any or all of:
    play a suggested musical selection if there is at least one of a similarity with the user's habits, a suggestion to play made by an occupant other than the user, a recommendation by a social network linked to the user, and a connection to a nomadic element if at least two occupants are present;

play a musical game if at least three occupants are present;

play unplayed episodes of a podcast to which the user subscribes; and play a radio broadcasting station which is suggested according to the user's listening habits and/or according to the location of the vehicle.

13. The method as claimed in claim 9, wherein the probable suggested actions of the system category comprise any or all of:

discover a software widget when the software widget at least one of corresponds to recorded interests of the user, and is similar to software widgets already downloaded;

record at least one of personal telephone numbers, and email addresses if a telephone or an internal connection is detected; and offer assistance or explanations regarding functions or gestures having a low or zero level of use or execution.

14. The method as claimed in claim 1, further comprising:

observing use made by the user of each of the probable suggested actions on the list; and withdrawing probable suggested actions from the list, or retaining suggested actions on the list, according to a result of the observation.

15. The method as claimed in claim 14, wherein the observation is carried out by a counter of a number of launches of probable suggested actions from the list.

16. A multimedia system installed on board a motor vehicle to assist a user of the motor vehicle, comprising:

a control unit that executes a method as claimed in claim 1; and a human-machine interface for transmitting to the user selected suggested actions received from the control unit.

17. The multimedia system as claimed in claim 16, wherein the control unit comprises:

a module for compiling probable suggested actions, which generates probable suggested actions and records them in a list of probable suggested actions contained in an electronic storage device; and a selection module configured to select at least one probable suggested action from among the list of probable suggested actions, if the context in which the vehicle is being used corresponds to a triggering event associated with the probable suggested action, and to transmit the selected suggested action to the human-machine interface.

18. A motor vehicle comprising a multimedia system as claimed in claim 16.

19. The motor vehicle as claimed in claim 18, further comprising devices configured to generate parameters associated with the context in which the motor vehicle is used.

20. A non-transitory computer readable medium which is readable by a control unit and on which is recorded a computer program comprising computer program code means for executing the method as claimed in claim 1.

* * * * *